United States Patent
Li et al.

(10) Patent No.: US 12,438,662 B2
(45) Date of Patent: Oct. 7, 2025

(54) REPETITION SPECIFIC CYCLIC SHIFTING OF A NON-INTERLEAVED CONTROL RESOURCE SET

(71) Applicant: QUALCOMM Incorporated, San Diego, CA (US)

(72) Inventors: Qiaoyu Li, Beijing (CN); Chao Wei, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/995,442

(22) PCT Filed: May 7, 2020

(86) PCT No.: PCT/CN2020/088948
§ 371 (c)(1),
(2) Date: Oct. 4, 2022

(87) PCT Pub. No.: WO2021/223147
PCT Pub. Date: Nov. 11, 2021

(65) Prior Publication Data
US 2023/0179356 A1    Jun. 8, 2023

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0071* (2013.01); *H04L 1/08* (2013.01); *H04L 5/0092* (2013.01); *H04L 27/2605* (2013.01)

(58) Field of Classification Search
CPC ....... H04L 5/0048; H04L 1/0071; H04L 1/08; H04L 5/0092; H04L 27/2605; H04L 5/0053; H04L 5/0091
See application file for complete search history.

(56) References Cited

U.S. PATENT DOCUMENTS 11,356,989 B2   6/2022   Zhang et al.
11,902,063 B2 *  2/2024   Liao .................. H04L 27/14
(Continued)

FOREIGN PATENT DOCUMENTS

CN    109802751 A    5/2019
CN    110446269 A    11/2019
(Continued)

OTHER PUBLICATIONS

Supplementary European Search Report—EP20934669—Search Authority—The Hague—Dec. 21, 2023.
(Continued)

*Primary Examiner* — Chandrahas B Patel
(74) *Attorney, Agent, or Firm* — Harrity & Harrity, LLP

(57) ABSTRACT

Various aspects of the present disclosure generally relate to wireless communication. In some aspects, a user equipment may determine a cyclic shift configuration for one or more repetitions of a non-interleaved control resource set (CORESET), and monitor for one or more physical downlink control channel candidates in the one or more repetitions of the non-interleaved CORESET based at least in part on determining the cyclic shift configuration for the one or more repetitions. Numerous other aspects are provided.

28 Claims, 8 Drawing Sheets

(51) Int. Cl.
  *H04L 1/08* (2006.01)
  *H04L 27/26* (2006.01)

(56) References Cited

U.S. PATENT DOCUMENTS

| | | | |
|---|---|---|---|
| 11,950,253 B2* | 4/2024 | Kim | H04L 27/2636 |
| 2019/0182807 A1 | 6/2019 | Panteleev et al. | |
| 2019/0222400 A1 | 7/2019 | Bagheri et al. | |
| 2019/0350049 A1 | 11/2019 | Miao et al. | |
| 2020/0045676 A1 | 2/2020 | Ryu et al. | |
| 2020/0100223 A1 | 3/2020 | Park et al. | |
| 2021/0306996 A1* | 9/2021 | Matsumura | H04W 72/20 |
| 2023/0156738 A1* | 5/2023 | Gao | H04L 5/0053 |
| | | | 370/330 |

FOREIGN PATENT DOCUMENTS

| | | |
|---|---|---|
| CN | 110476377 A | 11/2019 |
| CN | 110741702 A | 1/2020 |
| WO | WO-2021159224 A1 | 8/2021 |

OTHER PUBLICATIONS

International Search Report and Written Opinion—PCT/CN2020/088948—ISA/EPO—Feb. 18, 2021.
Spreadtrum Communications: "Discussion on PDCCH Repetition for Urllc", 3GPP Tsg Ran WG1 Meeting #92, 3GPP Draft; R1-1801840 Discussion on PDCCH Repetition for URLLC, 3rd Generation Partnership Project (3GPP), Mobile Competence Centre; 650, Route Des Lucioles; F-06921 Sophia-Antipolis Cedex; France, vol. Ran WG1, No. Athens, Greece; 20180226 - 20180302, Feb. 15, 2018, pp. 1-2, XP051396891, Section 2, the whole document.

* cited by examiner

REPETITION SPECIFIC CYCLIC SHIFTING OF A NON-INTERLEAVED CONTROL RESOURCE SET

CROSS-REFERENCE TO RELATED APPLICATION

This application is a 371 national stage of Patent Cooperation Treaty (PCT) Application No. PCT/CN2020/088948 filed on May 7, 2020, entitled "REPETITION SPECIFIC CYCLIC SHIFTING OF A NON-INTERLEAVED CONTROL RESOURCE SET," which is hereby expressly incorporated by reference herein.

FIELD OF THE DISCLOSURE

Aspects of the present disclosure generally relate to wireless communication and to techniques and apparatuses for repetition specific cyclic shifting of a non-interleaved control resource set.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a cyclic shift configuration for one or more repetitions of a non-interleaved control resource set (CORESET); and monitoring for one or more physical downlink control channel (PDCCH) candidates in the one or more repetitions of the non-interleaved CORESET based at least in part on determining the cyclic shift configuration for the one or more repetitions.

In some aspects, a method of wireless communication, performed by a base station, may include determining a cyclic shift configuration for one or more repetitions of a non-interleaved CORESET; and transmitting one or more PDCCH candidates in the one or more repetitions of the non-interleaved CORESET based at least in part on determining the cyclic shift configuration for the one or more repetitions.

In some aspects, a UE for wireless communication may include a memory and one or more processors operatively coupled to the memory. The memory and the one or more processors may be configured to determine a cyclic shift configuration for one or more repetitions of a non-interleaved CORESET; and monitor for one or more PDCCH candidates in the one or more repetitions of the non-interleaved CORESET based at least in part on determining the cyclic shift configuration for the one or more repetitions.

In some aspects, a base station for wireless communication may include a memory and one or more processors operatively coupled to the memory. The memory and the one or more processors may be configured to determine a cyclic shift configuration for one or more repetitions of a non-interleaved CORESET; and transmit one or more PDCCH candidates in the one or more repetitions of the non-interleaved CORESET based at least in part on determining the cyclic shift configuration for the one or more repetitions.

In some aspects, a non-transitory computer-readable medium may store one or more instructions for wireless communication. The one or more instructions, when executed by one or more processors of a UE, may cause the one or more processors to determine a cyclic shift configuration for one or more repetitions of a non-interleaved CORESET; and monitor for one or more PDCCH candidates in the one or more repetitions of the non-interleaved CORESET based at least in part on determining the cyclic shift configuration for the one or more repetitions.

In some aspects, a non-transitory computer-readable medium may store one or more instructions for wireless communication. The one or more instructions, when executed by one or more processors of a base station, may cause the one or more processors to determine a cyclic shift configuration for one or more repetitions of a non-interleaved CORESET; and transmit one or more PDCCH candidates in the one or more repetitions of the non-interleaved CORESET based at least in part on determining the cyclic shift configuration for the one or more repetitions.

In some aspects, an apparatus for wireless communication may include means for determining a cyclic shift configuration for one or more repetitions of a non-interleaved CORESET; and means for monitoring for one or more PDCCH candidates in the one or more repetitions of the non-interleaved CORESET based at least in part on determining the cyclic shift configuration for the one or more repetitions.

In some aspects, an apparatus for wireless communication may include means for determining a cyclic shift configuration for one or more repetitions of a non-interleaved CORESET; and means for transmitting one or more PDCCH candidates in the one or more repetitions of the non-interleaved CORESET based at least in part on determining the cyclic shift configuration for the one or more repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
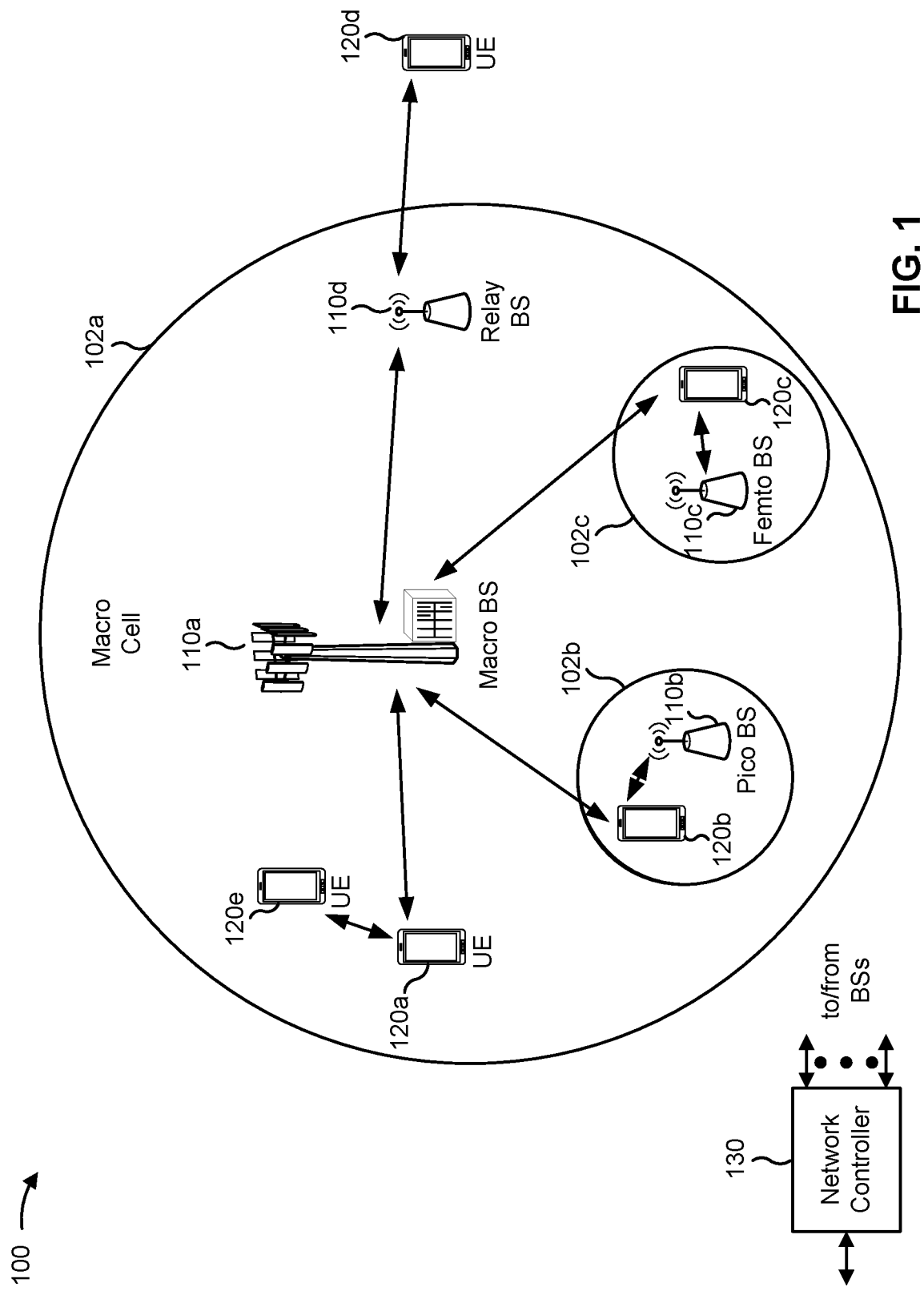
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
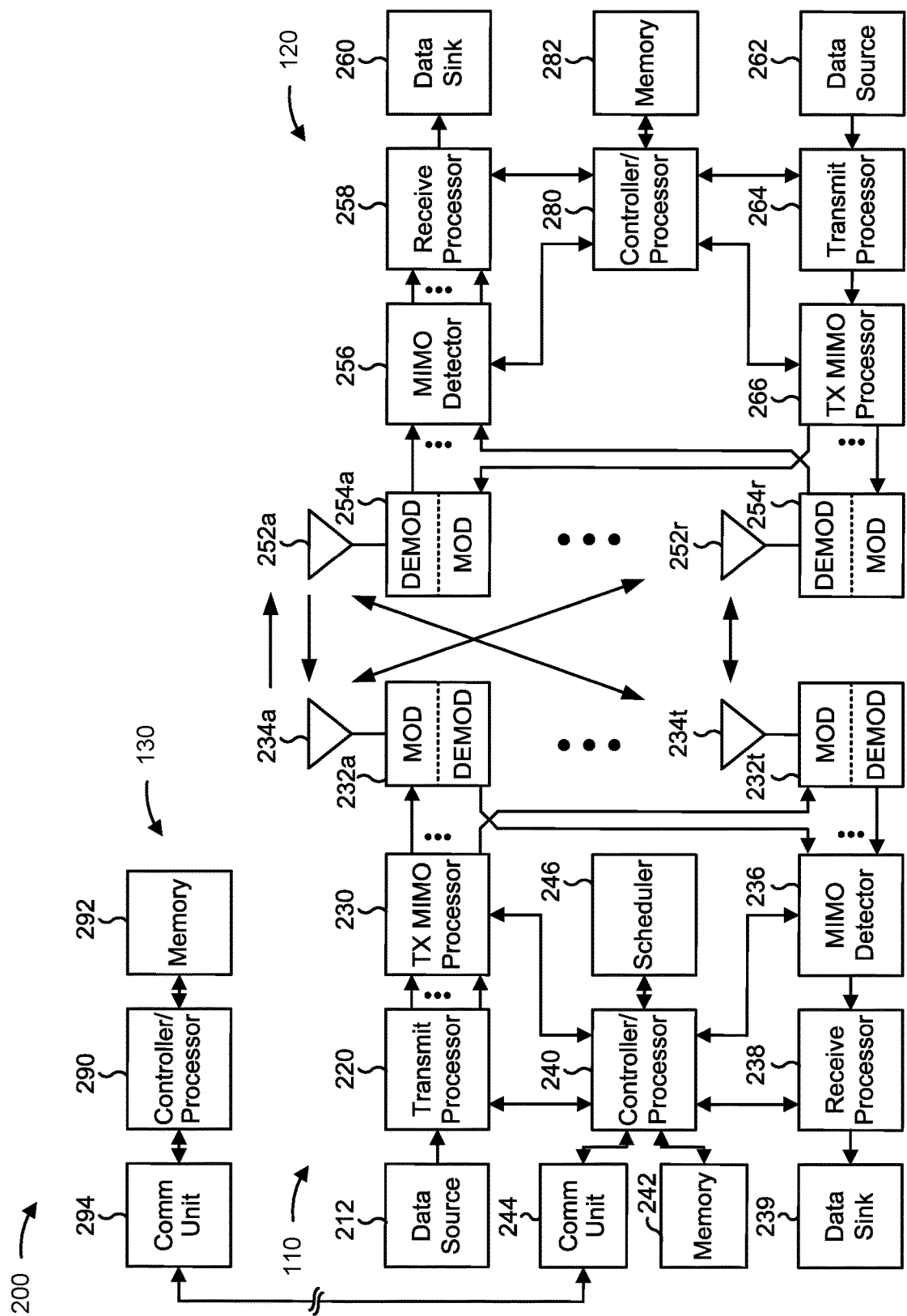
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with repetition specific cyclic shifting of a non-interleaved control resource set (CORESET), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining a cyclic shift configuration for one or more repetitions of a non-interleaved CORESET, means for monitoring for one or more physical downlink control channel (PDCCH) candidates in the one or more repetitions of the non-interleaved CORESET based at least in part on determining the cyclic shift configuration for the one or more repetitions, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a cyclic shift configuration for one or more repetitions of a non-interleaved CORESET, means for transmitting one or more PDCCH candidates in the one or more repetitions of the non-interleaved CORESET based at least in part on determining the cyclic shift configuration for the one or more repetitions, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
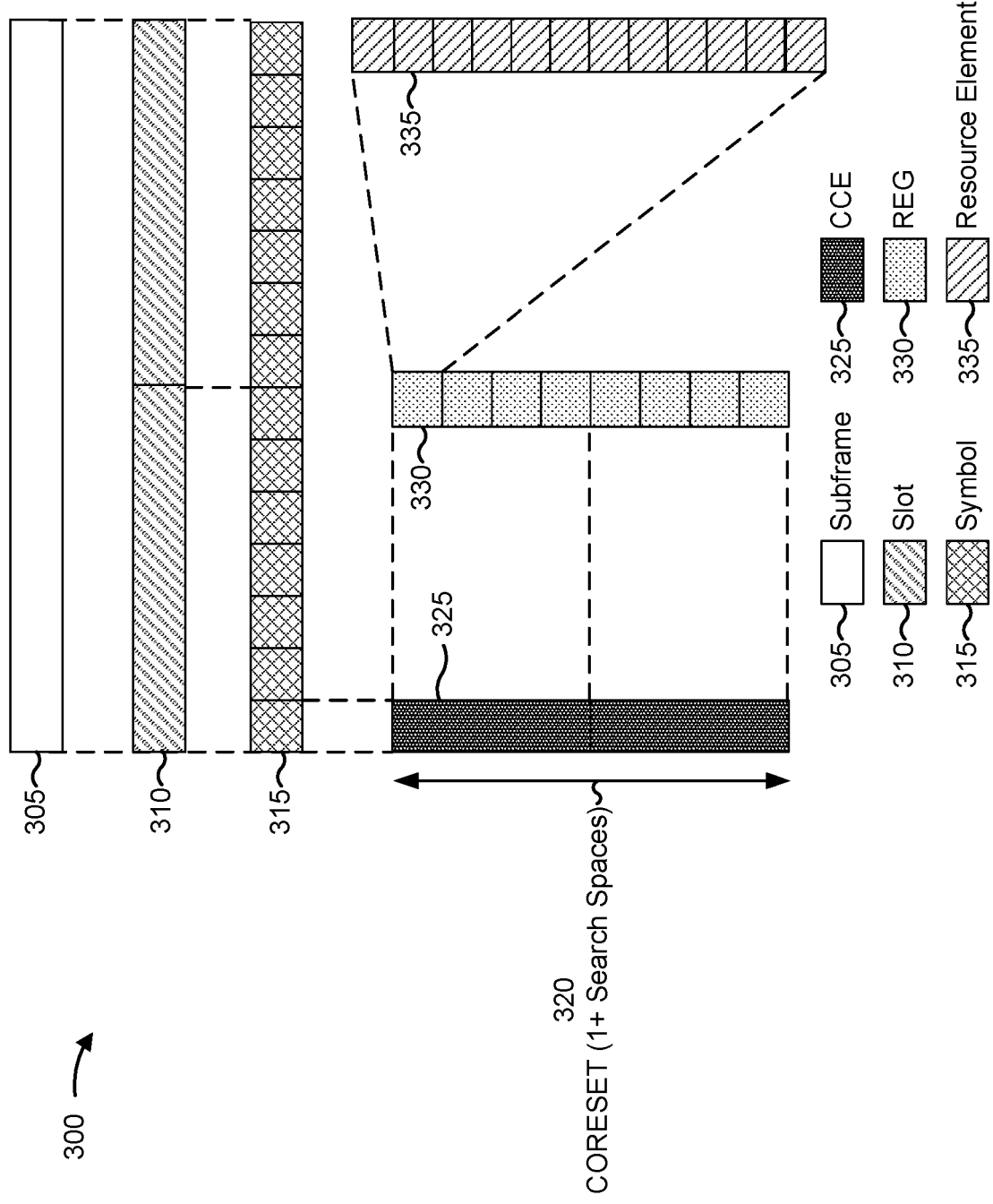
FIG. 3 is a diagram illustrating an example resource structure for wireless communication, in accordance with various aspects of the present disclosure.

FIG. 3 is a diagram illustrating an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as 4 REGs 330, or may include a variable quantity of REGs 330. In some aspects, the quantity of REGs 330 included in a CCE 325 may be specified by an REG bundle size. An REG 330 may include one resource block, which may include 12 resource elements (REs) 335 within a symbol 315. A resource element 335 may occupy one subcarrier in the frequency domain and one OFDM symbol in the time domain.

A search space may be all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

In order to decode a PDCCH, a UE may need the PDCCH to use a particular aggregation level (e.g., include a particular quantity of CCEs). For example, a UE with reduced capability and/or at a cell edge may be unable to decode a PDCCH that uses an aggregation level below a threshold value.

The CORESET may be interleaved or non-interleaved. An interleaved CORESET may include CCE to REG mapping such that adjacent CCEs are mapped to scattered REG bundles in the frequency domain (e.g., adjacent CCEs may not be mapped to consecutive REG bundles of the CORESET). A non-interleaved CORESET may include CCE to REG mapping such that all CCEs are mapped to consecutive REG bundles (e.g., in the frequency domain) of the CORESET.

In particular, different types of UEs may operate in a cell provided by a BS. For example, a BS may provide network service to a premium UE (which may be termed a legacy UE or a high-tier UE), an NR-Light (or NR-Lite) UE (which may be termed a low-tier UE), and/or the like. A premium UE may be a UE that is associated with a receive bandwidth capability in receiving downlink signals/channels that is above a particular threshold (for example, a bandwidth of greater than or equal to 100 megahertz (MHz)). In contrast, an NR-Light UE may be a UE with a bandwidth capability in receiving the downlink signals/channels that is below a particular threshold (for example, a bandwidth of less than 10 MHz, less than 5 MHz, or the like). Moreover, an NR-Light UE may have a lesser quantity of receive antennas or a lower computational or memory capacity than a premium UE.

Accordingly, NR-Light UEs that have reduced capability (e.g., a lesser quantity of receive antennas, a reduced bandwidth capability, and/or the like)) may be unable to decode a PDCCH that is below a particular aggregation level. However, due to the reduced capability of an NR-Light UE, it may not be possible to configure an NR-Light UE with a CORESET that includes a quantity of resource blocks that would permit higher aggregation levels. Thus, in some cases, a greater quantity of resource blocks may be included by expanding the CORESET using multiple repetitions of the CORESET. In some cases, such an expanded CORESET may be an interleaved CORESET. However, a UE (e.g., an NR-Light UE) may be unable to process certain interleaved CORESETs due to a reduced bandwidth capacity of the UE (e.g., an interleaved CORESET may require an expanded bandwidth based on CCEs of the interleaved CORESET being mapped to scattered REG bundles in the frequency domain).

Some techniques and apparatuses described herein enable repetition specific cyclic shifting of a non-interleaved CORESET. For example, a UE and/or a base station may be enabled to determine a cyclic shift configuration for one or more repetitions of a non-interleaved CORESET. As a result, spatial diversity through repetitions of the non-interleaved CORESET may be increased, thereby improving channel estimation parameters of a PDCCH. In this way, performance of a PDCCH may be improved (e.g., for an NR-Light UE).

As indicated above, FIG. 3 is provided as an example. Other examples may differ from what is described with respect to FIG. 3.

Figure 4:
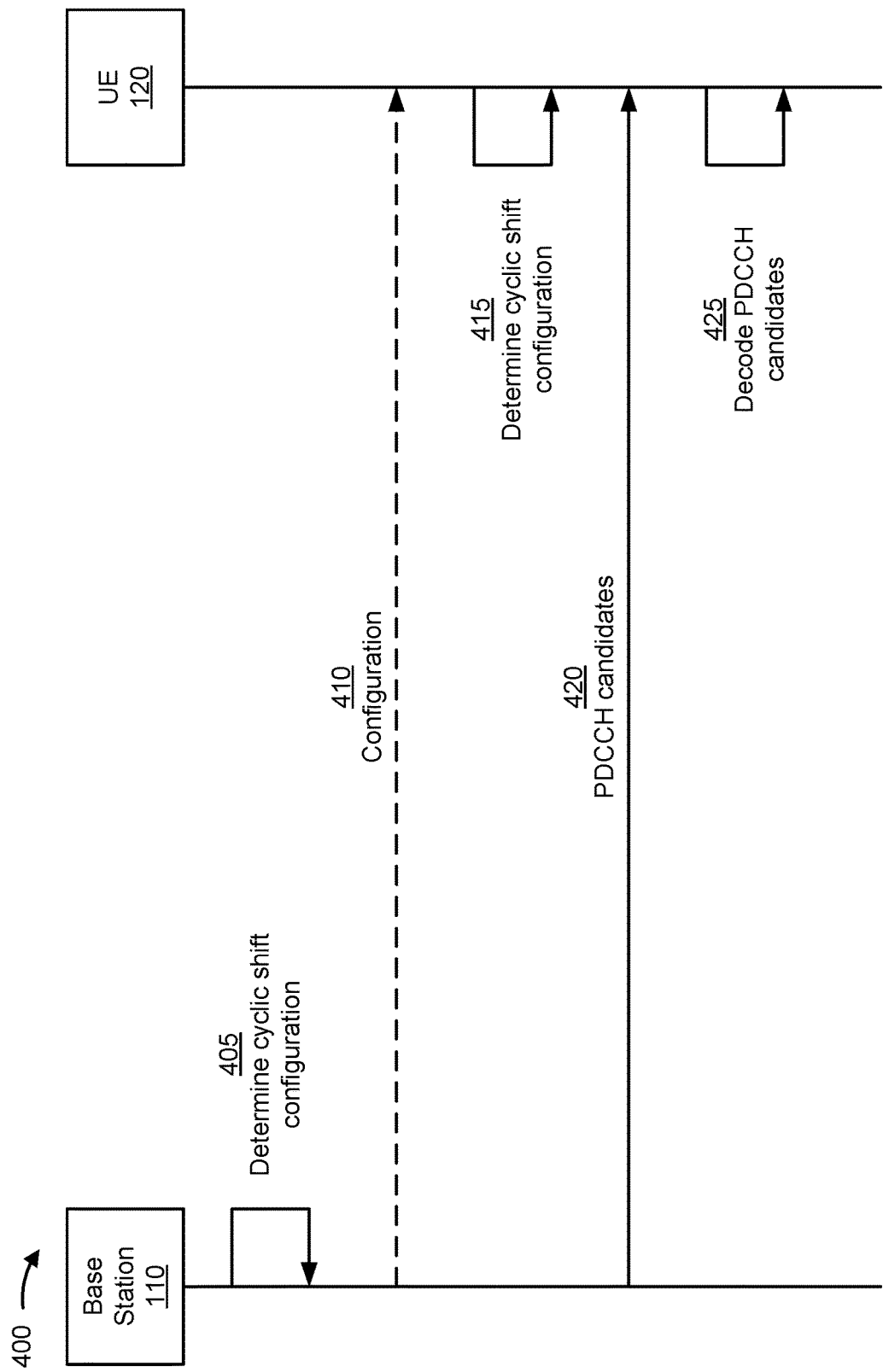
FIG. 4 is a diagram illustrating an example of repetition specific cyclic shifting of a non-interleaved control resource set (CORESET), in accordance with various aspects of the present disclosure.

FIG. 4 is a diagram illustrating an example 400 of repetition specific cyclic shifting of a non-interleaved CORESET, in accordance with various aspects of the present disclosure. As shown in FIG. 4, a base station 110 and a UE 120 may communicate with one another in connection with a PDCCH communication. In some aspects, the UE 120 may be an NR-Light UE, such as a wearable device, an Internet of Things (IoT) device, a sensor, a camera, and/or the like, that is associated with a limited bandwidth, power capacity, transmission range, and/or the like. For example, the UE 120 may have a quantity of receive antennas that satisfies (e.g., is below) a threshold value and/or a bandwidth capability that satisfies (e.g., is below) a threshold value.

As shown in FIG. 4, and by reference number 405, the base station 110 may determine a cyclic shift configuration that is to be used for a non-interleaved CORESET (e.g., a non-interleaved CORESET in which the base station 110 is to transmit one or repetitions of the non-interleaved CORESET to the UE 120 on one or more PDCCH candidates).

As shown by reference number 410, the base station 110 may transmit, and the UE 120 may receive, the cyclic shift configuration that is determined. For example, the base station 110 may transmit the cyclic shift configuration in a PDCCH configuration, a CORESET configuration, and/or the like. The base station 110 may transmit the cyclic shift configuration by RRC signaling. In some aspects, the base station 110 may not transmit the cyclic shift configuration to the UE 120, such as when the cyclic shift configuration is determined by the UE 120 in another manner, as described below.

As shown by reference number 415, the UE 120 may determine a cyclic shift configuration that is to be used for a non-interleaved CORESET (e.g., a non-interleaved CORESET in which the base station 110 is to transmit one or more PDCCH repetitions to the UE 120 on one or more PDCCH candidates). In some aspects, a cyclic shift configuration may identify a cyclic shift index (e.g., a ShiftIndex parameter) for the non-interleaved CORESET (e.g., an index of an REG, a resource block, an REG bundle, and/or the like, from which REG bundles of the non-interleaved CORESET are to be cyclic shifted). In some aspects, a cyclic shift configuration may identify a frequency domain cyclic shift for the one or more REG bundles of the non-interleaved CORESET (e.g., identifying a cyclic shift in terms of a quantity of REG bundles), as described below with respect to FIG. 5.

In some aspects, the non-interleaved CORESET may be encoded (e.g., by the base station 110) with a plurality of coded bits corresponding to the PDCCH (e.g., a plurality of bits of the non-interleaved CORESET may be encoded by a PDCCH channel code to form PDCCH coded bits). In some aspects, a cyclic shift configuration may identify a cyclic shift for the plurality of PDCCH coded bits, as described below with respect to FIG. 6.

In some aspects, the UE 120 may determine a cyclic shift configuration that is to be used for respective repetitions of the non-interleaved CORESET. For example, the UE 120 may determine a first cyclic shift configuration (e.g., a first cyclic shift index) for a first repetition of the non-interleaved CORESET, a second cyclic shift configuration (e.g., a second cyclic shift index) for a second repetition of the non-interleaved CORESET, and so forth. The repetitions of the non-interleaved CORESET may be inter-slot repetitions (e.g., repetitions occurring in multiple slots) and/or intra-slot repetitions (e.g., repetitions occurring in a single slot).

In some aspects, such as when the base station 110 transmits the cyclic shift configuration (e.g., by RRC signaling), the UE 120 may determine the cyclic shift configuration based at least in part on the configuration(s) that is transmitted by the base station 110. In some aspects, the UE 120 may determine the cyclic shift configuration in another manner.

For example, the UE 120 may determine a cyclic shift configuration for a particular repetition of the non-interleaved CORESET based at least in part on a slot index associated with the repetition (e.g., for an inter-slot repetition) and/or a starting symbol index associated with the repetition (e.g., for an intra-slot repetition). As an example, the UE 120 may determine a first cyclic shift configuration for a first repetition of the non-interleaved CORESET based at least in part on a slot index and/or a starting symbol index of the first repetition, a second cyclic shift configuration for a second repetition of the non-interleaved CORESET based at least in part on a slot index and/or a starting symbol index of the second repetition, and so forth. In this case, the base station 110 also may determine a corresponding cyclic shift configuration for a particular repetition of the non-interleaved CORESET in a similar manner.

As shown by reference number 420, the base station 110 may transmit on one or more PDCCH candidates in the non-interleaved CORESET. That is, the base station 110 may transmit one or more PDCCHs for the UE 120 on the one or more PDCCH candidates. In some aspects, such as when the non-interleaved CORESET is repeated in multiple repetitions, the base station 110 may transmit on one or more PDCCH candidates in the multiple repetitions of the non-interleaved CORESET. The base station 110 may transmit on the one or more PDCCH candidates using a cyclic shift in accordance with a cyclic shift configuration determined by the base station 110.

As shown by reference number 425, the UE 120 may monitor for one or more PDCCH candidates in the non-interleaved CORESET. In some aspects, such as when the non-interleaved CORESET is repeated in multiple repetitions, the UE 120 may monitor for one or more PDCCH candidates in the multiple repetitions of the non-interleaved CORESET. The UE 120 may monitor for the one or more PDCCH candidates in accordance with a cyclic shift configuration determined by the UE 120 (e.g., for a particular repetition of the non-interleaved CORESET). That is, the UE 120 may decode (e.g., de-shift and/or the like) one or more PDCCHs in the one or more PDCCH candidates using a cyclic shift in accordance with a cyclic shift configuration determined by the UE 120 (e.g., for a particular repetition of the non-interleaved CORESET).

In some aspects, demodulation reference signals (DMRSs) of different repetitions of the non-interleaved CORESET may be time domain-bundled. For example, repetitions of the non-interleaved CORESET may be received across one or more aggregated slots. The DMRSs of the one or more repetitions of the non-interleaved CORE- SET may be time domain-bundled such that the UE 120 may perform joint channel estimation across the aggregated slots, rather than performing a separate channel estimate for each slot based on DMRS(s) received in that slot. In this way, channel estimation performance may be improved while maintaining spatial diversity through the repetitions of the non-interleaved CORESET (e.g., based at least in part on the cyclic shift configuration).

As indicated above, FIG. 4 is provided as an example. Other examples may differ from what is described with respect to FIG. 4.

Figure 5:
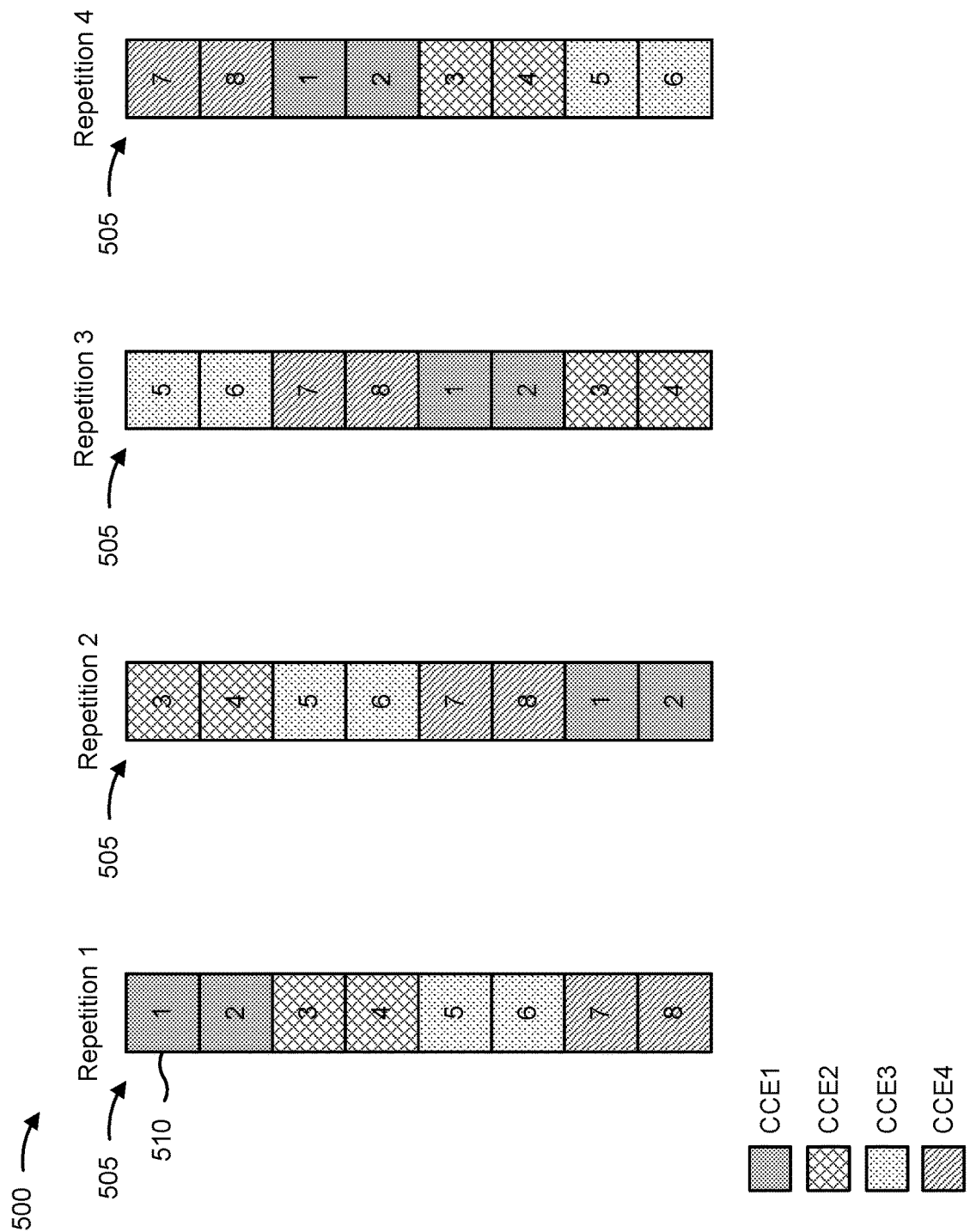
FIG. 5 is a diagram illustrating an example of cyclic shifting of repetitions of a non-interleaved CORESET, in accordance with various aspects of the present disclosure.

FIG. 5 is a diagram illustrating an example 500 of cyclic shifting of repetitions of a non-interleaved CORESET, in accordance with various aspects of the present disclosure.

As shown in FIG. 5, a non-interleaved CORESET 505 may include a plurality of REG bundles 510. The REG bundles 510 may include a plurality of REGs. For example, an REG bundle 510 may include 2 REGs, 3 REGs, 4 REGs, 6 REGs, and/or the like. As explained above, the REG bundles may occupy consecutive frequency domain resources (e.g., REG bundle 2 may include frequency domain resources that are contiguous to frequency domain resources of REG bundle 1 and frequency domain resources of REG bundle 3). An REG bundle may include REGs that are contiguous in the frequency and/or time domain. An REG bundle may include a quantity of REGs, such as two REGs, three REGs, six REGs, and/or the like.

In some aspects, the REG bundles 510 of the non-interleaved CORESET 505 may be cyclic shifted (e.g., by base station 110) according to a common frequency domain cyclic shift for each repetition of the non-interleaved CORESET 505. That is, REG bundles for a repetition of the non-interleaved CORESET 505 may be cyclic shifted, in the frequency domain, by the same quantity of REG bundles (e.g., the same cyclic shift index). In some aspects, REG bundles for a repetition of the non-interleaved CORESET 505 may be cyclic shifted, in the frequency domain, by the same quantity of resource blocks. That is, if an REG bundle of the non-interleaved CORESET 505 includes two resource blocks, REG bundles for a repetition of the non-interleaved CORESET 505 may be cyclic shifted, in the frequency domain, by a multiple of two resource blocks (e.g., two resource blocks (e.g., one REG bundle), four resource blocks (e.g., two REG bundles), six resource blocks (e.g., three REG bundles), and/or the like). In some aspects, an REG bundle of the non-interleaved CORESET 505 may include a different quantity of resource blocks.

For example, the REG bundles 510 of a first repetition of the non-interleaved CORESET 505 (e.g., repetition 1) may be cyclic shifted according to a first cyclic shift (e.g., zero REG bundles in the frequency domain, as shown), the REG bundles 510 of a second repetition of the non-interleaved CORESET 505 (e.g., repetition 2) may be cyclic shifted according to a second cyclic shift (e.g., two REG bundles in the frequency domain, as shown), the REG bundles 510 of a third repetition of the non-interleaved CORESET 505 (e.g., repetition 3) may be cyclic shifted according to a third cyclic shift (e.g., four REG bundles in the frequency domain, as shown), the REG bundles 510 of a fourth repetition of the non-interleaved CORESET 505 (e.g., repetition 4) may be cyclic shifted according to a fourth cyclic shift (e.g., six REG bundles in the frequency domain, as shown), and so forth. In some aspects, the cyclic shift may be based at least in part on a total quantity of repetitions of the non-interleaved CORESET 505 (e.g., the quantity of REG bundles by which the non-interleaved CORESET 505 is cyclic shifted may be based at least in part on the total quantity of repetitions of the non-interleaved CORESET 505).

In some aspects, a cyclic shift configuration transmitted by the base station 110 may identify respective cyclic shifts for the repetitions of the non-interleaved CORESET 505. In some aspects, the UE 120 may determine respective cyclic shifts for the repetitions of the non-interleaved CORESET 505 (or a common cyclic shift for the repetition) based at least in part on respective starting symbol indices for the repetition. For example, the UE 120 may determine a first cyclic shift for a first repetition based at least in part on a first starting symbol of the first repetition, a second cyclic shift for a second repetition based at least in part on a second starting symbol of the second repetition, and so forth.

As indicated above, FIG. 5 is provided as an example. Other examples may differ from what is described with respect to FIG. 5.

Figure 6:
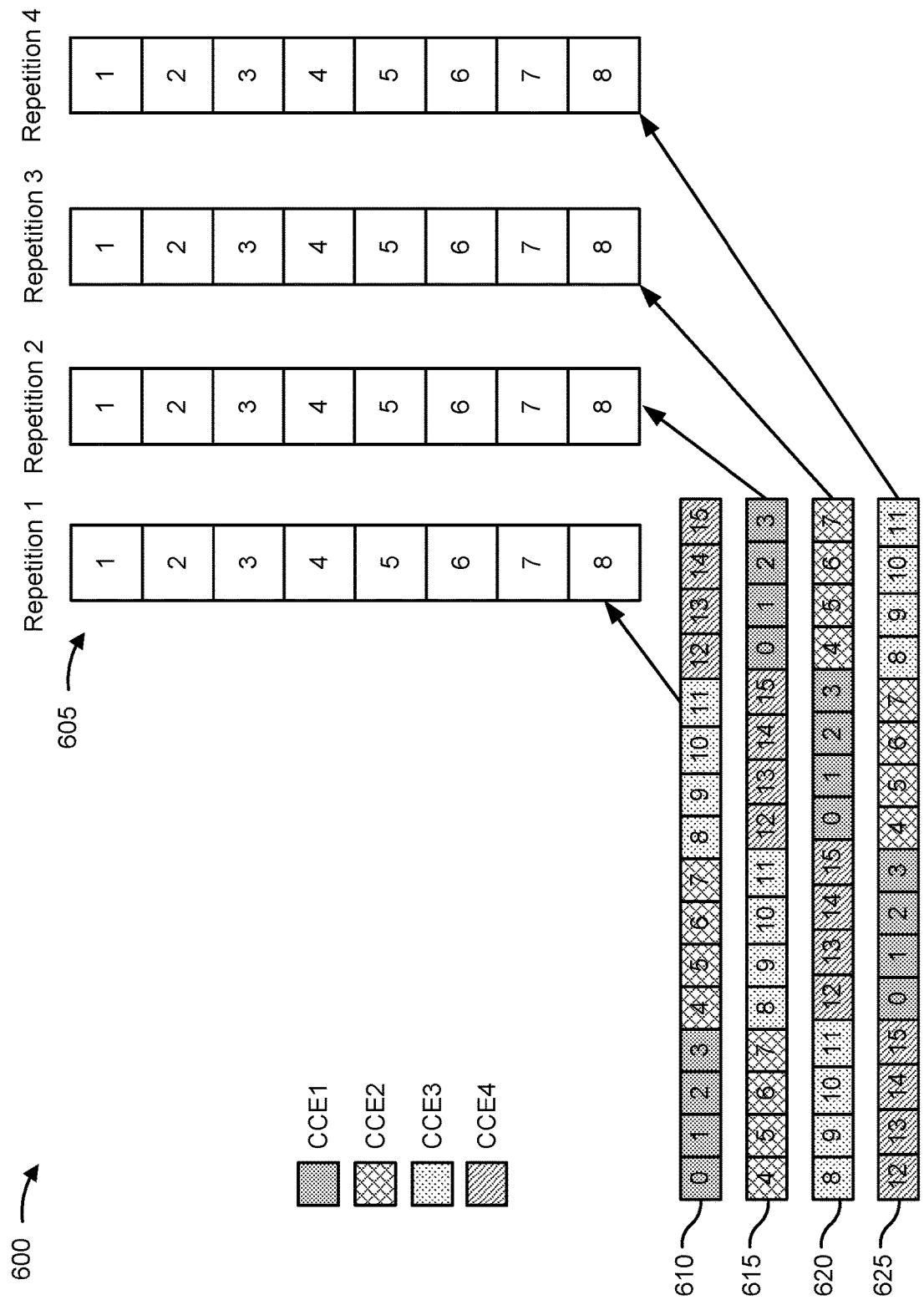
FIG. 6 is a diagram illustrating an example of cyclic shifting of repetitions of a non-interleaved CORESET, in accordance with various aspects of the present disclosure.

FIG. 6 is a diagram illustrating an example of cyclic shifting of repetitions of a non-interleaved CORESET, in accordance with various aspects of the present disclosure. In particular, FIG. 6 may illustrate an example of cyclic shifting of coded bits of a non-interleaved CORESET 605.

As shown in FIG. 6, a non-interleaved CORESET 605 may include a plurality of REG bundles (e.g., 8 REG bundles, as shown). The REG bundles may include a plurality of REGs. For example, an REG bundle may include 2 REGs, 3 REGs, 4 REGs, 6 REGs, and/or the like. As explained above, the REG bundles may occupy consecutive frequency domain resources (e.g., REG bundle 2 may include frequency domain resources that are contiguous to frequency domain resources of REG bundle 1 and frequency domain resources of REG bundle 3).

As shown by reference numbers 610, 615, 620, and 625, each repetition of the non-interleaved CORESET 605 may be encoded with a plurality of coded bits. The coded bits may include cyclic redundancy check (CRC) bits, downlink control information (DCI) payload bits, radio network temporary identifier (RNTI) bits, and/or the like. The bits may be encoded to a repetition of the non-interleaved CORESET by the base station 110 (e.g., using a Polar encoder, by rate matching, and/or the like). The coded bits may be referred to as PDCCH coded bits. A block as shown in FIG. 6 (e.g., by reference numbers 610, 615, 620, and 625) may represent a multi-byte group index of the PDCCH coded bits (e.g., including a plurality of PDCCH coded bits). As shown in FIG. 6, one or more multi-byte groups may be mapped to a CCE. In some aspects, different multi-byte groups may correspond to different REG bundles of the non-interleaved CORESET 605. For example, as shown by reference number 610, multi-byte groups 0 and 1 may correspond to REG bundle 1, as shown by reference number 615, multi-byte groups 4 and 5 may correspond to REG bundle 1, and so forth.

In some aspects, the PDCCH coded bits of the non-interleaved CORESET 605 may be cyclic shifted (e.g., by base station 110) according to a cyclic shift for each repetition of the non-interleaved CORESET 605. That is, PDCCH coded bits for a repetition of the non-interleaved CORESET 605 may be cyclic shifted by the same quantity of bits (e.g., the same cyclic shift index). In some aspects, PDCCH coded bits for a repetition of the non-interleaved CORESET 605 may be cyclic shifted by the same quantity of multi-byte groups.

For example, the PDCCH coded bits 610 of a first repetition of the non-interleaved CORESET 605 (e.g., repetition 1) may be cyclic shifted according to a first cyclic shift (e.g., zero multi-byte groups, as shown), the PDCCH coded bits 615 of a second repetition of the non-interleaved CORESET 605 (e.g., repetition 2) may be cyclic shifted according to a second cyclic shift (e.g., four multi-byte groups, as shown), the PDCCH coded bits 620 of a third repetition of the non-interleaved CORESET 605 (e.g., repetition 3) may be cyclic shifted according to a third cyclic shift (e.g., eight multi-byte groups, as shown), the PDCCH coded bits 620 of a fourth repetition of the non-interleaved CORESET 605 (e.g., repetition 4) may be cyclic shifted according to a fourth cyclic shift (e.g., twelve multi-byte groups, as shown), and so forth. In some aspects, the cyclic shift may be based at least in part on a total quantity of repetitions of the non-interleaved CORESET 605 (e.g., the quantity of multi-byte groups by which the PDCCH coded bits of the non-interleaved CORESET 605 are cyclic shifted may be based at least in part on the total quantity of repetitions of the non-interleaved CORESET 605). In some aspects, one or more bits of the PDCCH coded bits may correspond to one or more resource blocks of the non-interleaved CORESET 605.

In some aspects, a cyclic shift configuration transmitted by the base station 110 may identify respective cyclic shifts for the repetitions of the non-interleaved CORESET 605. In some aspects, the UE 120 may determine respective cyclic shifts for the repetitions of the non-interleaved CORESET 605 (or a common cyclic shift for the repetition) based at least in part on respective starting symbol indices for the repetition. For example, the UE 120 may determine a first cyclic shift for a first repetition based at least in part on a first starting symbol of the first repetition, a second cyclic shift for a second repetition based at least in part on a second starting symbol of the second repetition, and so forth.

In some aspects, the PDCCH bits of each repetition of the non-interleaved CORESET 605 may be randomized. In some aspects, a cyclic shift configuration may identify a sub-block interleaving configuration (e.g., a sub-block interleaving pattern) for the PDCCH coded bits of the repetitions of the non-interleaved CORESET 605. A sub-block interleaving configuration may vary between different repetitions of the non-interleaved CORESET 605. For example, the UE 120 may determine a first sub-block interleaving configuration for PDCCH coded bits for a first repetition of the non-interleaved CORESET 605, a second sub-block interleaving configuration for PDCCH coded bits for a second repetition of the non-interleaved CORESET 605, and so forth. The sub-block interleaving configuration for a repetition of the non-interleaved CORESET may be based at least in part on a starting symbol index of the repetition, a total quantity of repetitions of the non-interleaved CORESET, a slot index of the repetition (e.g., a slot index of a slot in which the repetition is located), and/or the like.

In some aspects, a cyclic shift configuration may identify a bit interleaving configuration (e.g., a bit interleaving pattern) for the PDCCH coded bits of the repetitions of the non-interleaved CORESET 605. A bit interleaving configuration may vary between different repetitions of the non-interleaved CORESET 605. For example, the UE 120 may determine a first bit interleaving configuration for PDCCH coded bits for a first repetition of the non-interleaved CORESET 605, a second bit interleaving configuration for PDCCH coded bits for a second repetition of the non-interleaved CORESET 605, and so forth. The bit interleaving configuration for a repetition of the non-interleaved CORESET may be based at least in part on a starting symbol index of the repetition, a total quantity of repetitions of the non-inter-leaved CORESET, a slot index of the repetition (e.g., a slot index of a slot in which the repetition is located), and/or the like.

In some aspects, a cyclic shift configuration transmitted by the base station 110 may identify respective cyclic shifts (e.g., identifying a cyclic shift for PDCCH coded bits, a sub-block interleaving configuration for PDCCH coded bits, a bit interleaving configuration for PDCCH coded bits, and/or the like) for the repetitions of the non-interleaved CORESET 605. In some aspects, the UE 120 may determine respective cyclic shifts for the repetitions of the non-interleaved CORESET 605 (or a common cyclic shift for the repetition) based at least in part on respective starting symbol indices for the repetition. For example, the UE 120 may determine a first cyclic shift for a first repetition based at least in part on a first starting symbol of the first repetition, a second cyclic shift for a second repetition based at least in part on a second starting symbol of the second repetition, and so forth.

As indicated above, FIG. 6 is provided as an example. Other examples may differ from what is described with respect to FIG. 6.

Figure 7:
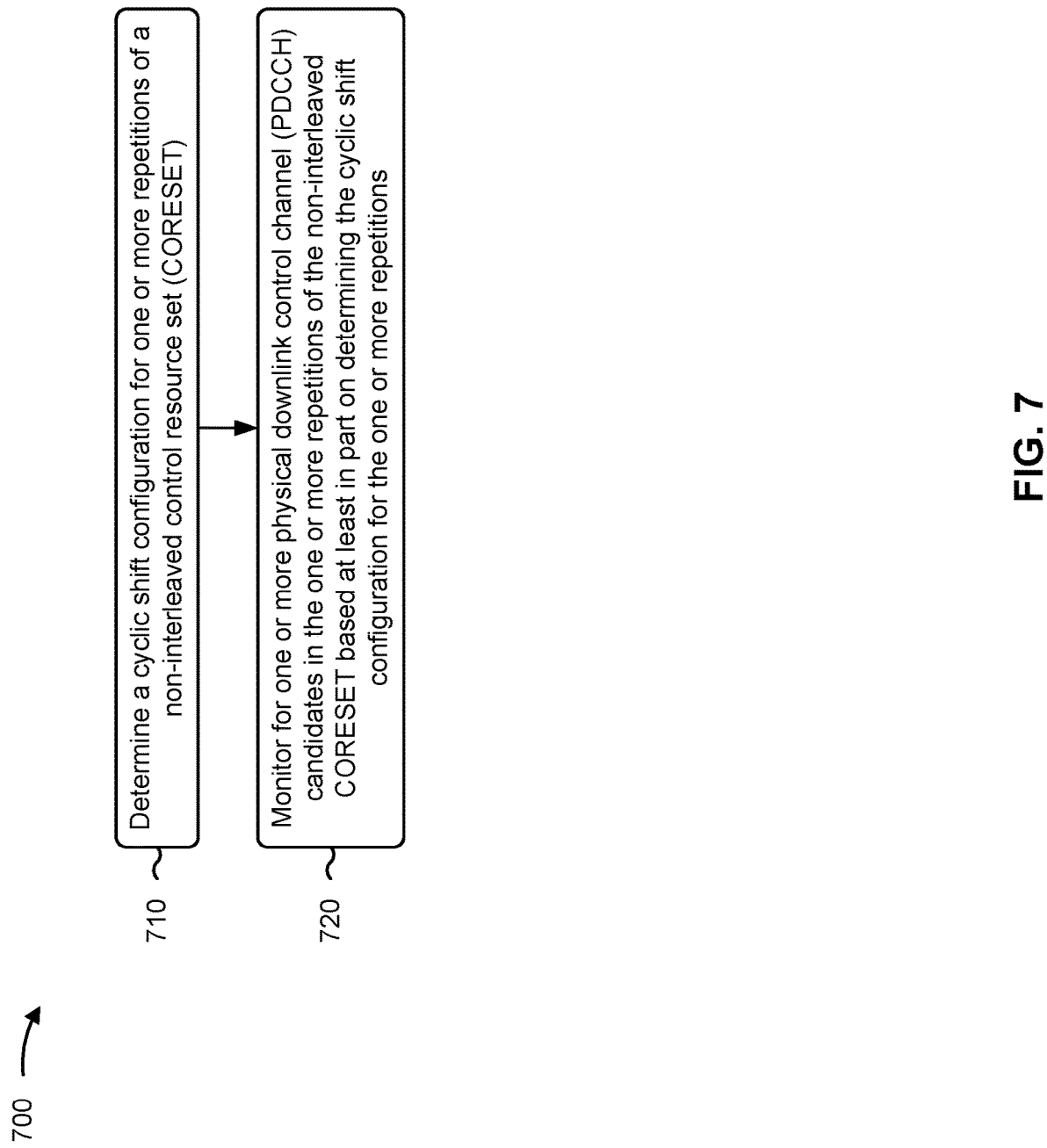
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with repetition specific cyclic shifting of a non-interleaved CORESET.

As shown in FIG. 7, in some aspects, process 700 may include determining a cyclic shift configuration for one or more repetitions of a non-interleaved CORESET (block 710). For example, the UE (e.g., using receive processor 258, transmit processor 264, controller/processor 280, memory 282, and/or the like) may determine a cyclic shift configuration for one or more repetitions of a non-interleaved CORESET, as described above.

As further shown in FIG. 7, in some aspects, process 700 may include monitoring for one or more PDCCH candidates in the one or more repetitions of the non-interleaved CORESET based at least in part on determining the cyclic shift configuration for the one or more repetitions (block 720). For example, the UE (e.g., using receive processor 258, transmit processor 264, controller/processor 280, memory 282, and/or the like) may monitor for one or more PDCCH candidates in the one or more repetitions of the non-interleaved CORESET based at least in part on determining the cyclic shift configuration for the one or more repetitions, as described above.

Process 700 may include additional aspects, such as any single aspect or any combination of aspects described below and/or in connection with one or more other processes described elsewhere herein.

In a first aspect, the non-interleaved CORESET includes one or more resource element group (REG) bundles, and the cyclic shift configuration identifies a frequency domain cyclic shift for the one or more REG bundles.

In a second aspect, alone or in combination with the first aspect, the cyclic shift configuration identifies a frequency domain cyclic shift in terms of a quantity of REG bundles.

In a third aspect, alone or in combination with one or more of the first and second aspects, a first cyclic shift configuration for a first repetition of the non-interleaved CORESET identifies a first cyclic shift index, and a second cyclic shift configuration for a second repetition of the non-interleaved CORESET identifies a second cyclic shift index.

In a fourth aspect, alone or in combination with one or more of the first through third aspects, process 700 includes receiving the cyclic shift configuration for the one or more repetitions of the non-interleaved CORESET via radio resource control signaling.

In a fifth aspect, alone or in combination with one or more of the first through fourth aspects, the cyclic shift configuration of a repetition of the one or more repetitions of the non-interleaved CORESET is based at least in part on a starting symbol index of the repetition.

In a sixth aspect, alone or in combination with one or more of the first through fifth aspects, the cyclic shift configuration is based at least in part on a total quantity of repetitions of the non-interleaved CORESET.

In a seventh aspect, alone or in combination with one or more of the first through sixth aspects, one or more demodulation reference signals of the one or more repetitions of the non-interleaved CORESET are configured to be time domain bundled.

In an eighth aspect, alone or in combination with one or more of the first through seventh aspects, the non-interleaved CORESET is encoded with a plurality of PDCCH coded bits, and the cyclic shift configuration identifies a cyclic shift for the plurality of PDCCH coded bits.

In a ninth aspect, alone or in combination with one or more of the first through eighth aspects, the non-interleaved CORESET is encoded with a plurality of PDCCH coded bits, and determining the cyclic shift configuration for the one or more repetitions of the non-interleaved CORESET comprises determining a sub-block interleaving configuration for the plurality of PDCCH coded bits of the one or more repetitions of the non-interleaved CORESET.

In a tenth aspect, alone or in combination with one or more of the first through ninth aspects, the sub-block interleaving configuration for a repetition of the one or more repetitions of the non-interleaved CORESET is based at least in part on at least one of: a starting symbol index of the repetition, a total quantity of repetitions of the non-interleaved CORESET, or a slot index of the repetition.

In an eleventh aspect, alone or in combination with one or more of the first through tenth aspects, the non-interleaved CORESET is encoded with a plurality of PDCCH coded bits, and determining the cyclic shift configuration for the one or more repetitions of the non-interleaved CORESET comprises determining a bit interleaving configuration for the plurality of PDCCH coded bits of the one or more repetitions.

In a twelfth aspect, alone or in combination with one or more of the first through eleventh aspects, the bit interleaving configuration for a repetition of the one or more repetitions of the non-interleaved CORESET is based at least in part on at least one of: a starting symbol index of the repetition, a total quantity of repetitions of the non-interleaved CORESET, or a slot index of the repetition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
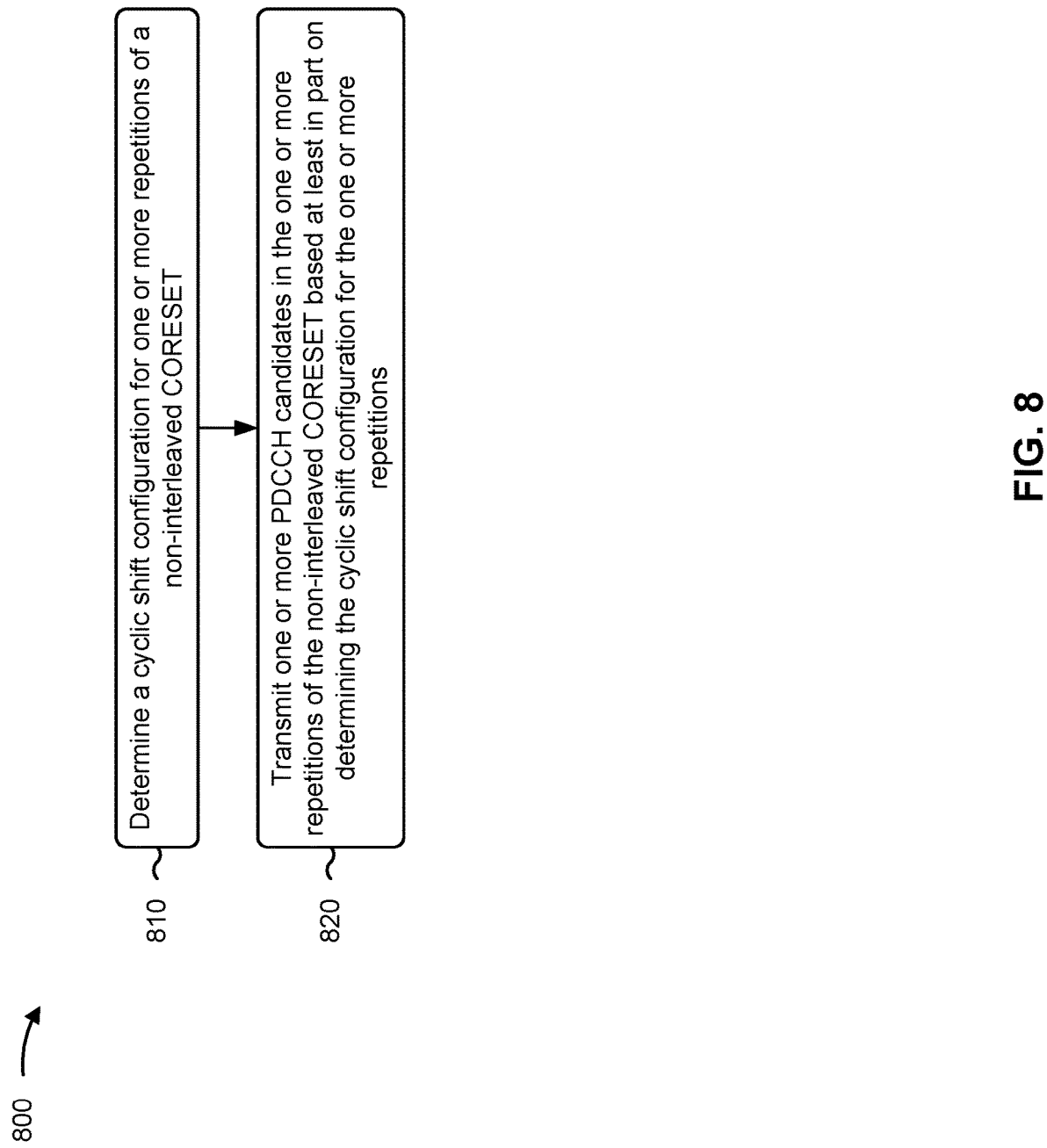
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations associated with repetition specific cyclic shifting of a non-interleaved CORESET.

As shown in FIG. 8, in some aspects, process 800 may include determining a cyclic shift configuration for one or more repetitions of a non-interleaved CORESET (block 810). For example, the base station (e.g., using transmit processor 220, receive processor 238, controller/processor 240, memory 242, and/or the like) may determine a cyclic shift configuration for one or more repetitions of a non-interleaved CORESET, as described above.

As further shown in FIG. 8, in some aspects, process 800 may include transmitting one or more PDCCH candidates in the one or more repetitions of the non-interleaved CORESET based at least in part on determining the cyclic shift configuration for the one or more repetitions (block 820). For example, the base station (e.g., using transmit processor 220, receive processor 238, controller/processor 240, memory 242, and/or the like) may transmit one or more PDCCH candidates in the one or more repetitions of the non-interleaved CORESET based at least in part on determining the cyclic shift configuration for the one or more repetitions, as described above.

Process 800 may include additional aspects, such as any single aspect or any combination of aspects described below and/or in connection with one or more other processes described elsewhere herein.

In a first aspect, the non-interleaved CORESET includes one or more REG bundles, and the cyclic shift configuration identifies a frequency domain cyclic shift for the one or more REG bundles.

In a second aspect, alone or in combination with the first aspect, the cyclic shift configuration identifies a frequency domain cyclic shift in terms of a quantity of REG bundles.

In a third aspect, alone or in combination with one or more of the first and second aspects, a first cyclic shift configuration for a first repetition of the non-interleaved CORESET identifies a first cyclic shift index, and a second cyclic shift configuration for a second repetition of the non-interleaved CORESET identifies a second cyclic shift index.

In a fourth aspect, alone or in combination with one or more of the first through third aspects, process 800 includes transmitting the cyclic shift configuration for the one or more repetitions of the non-interleaved CORESET via radio resource control signaling.

In a fifth aspect, alone or in combination with one or more of the first through fourth aspects, the cyclic shift configuration of a repetition of the one or more repetitions of the non-interleaved CORESET is based at least in part on a starting symbol index of the repetition.

In a sixth aspect, alone or in combination with one or more of the first through fifth aspects, the cyclic shift configuration is based at least in part on a total quantity of repetitions of the non-interleaved CORESET.

In a seventh aspect, alone or in combination with one or more of the first through sixth aspects, one or more demodulation reference signals of the one or more repetitions of the non-interleaved CORESET are configured to be time domain bundled.

In an eighth aspect, alone or in combination with one or more of the first through seventh aspects, the non-interleaved CORESET is encoded with a plurality of PDCCH coded bits, and the cyclic shift configuration identifies a cyclic shift for the plurality of PDCCH coded bits.

In a ninth aspect, alone or in combination with one or more of the first through eighth aspects, the non-interleaved CORESET is encoded with a plurality of PDCCH coded bits, and determining the cyclic shift configuration for the one or more repetitions of the non-interleaved CORESET comprises determining a sub-block interleaving configuration for the plurality of PDCCH coded bits of the one or more repetitions.

In a tenth aspect, alone or in combination with one or more of the first through ninth aspects, the sub-block interleaving configuration for a repetition of the one or more repetitions of the non-interleaved CORESET is based at least in part on at least one of: a starting symbol index of the repetition, a total quantity of repetitions of the non-interleaved CORESET, or a slot index of the repetition.

In an eleventh aspect, alone or in combination with one or more of the first through tenth aspects, the non-interleaved CORESET is encoded with a plurality of PDCCH coded bits, and determining the cyclic shift configuration for the one or more repetitions of the non-interleaved CORESET comprises determining a bit interleaving configuration for the plurality of PDCCH coded bits of the one or more repetitions.

In a twelfth aspect, alone or in combination with one or more of the first through eleventh aspects, the bit interleaving configuration for a repetition of the one or more repetitions of the non-interleaved CORESET is based at least in part on at least one of: a starting symbol index of the repetition, a total quantity of repetitions of the non-interleaved CORESET, or a slot index of the repetition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a cyclic shift configuration for one or more repetitions of a control resource set (CORESET), the CORESET including one or more resource element group (REG) bundles and control channel element (CCE) to REG mapping that corresponds to consecutive REG bundles in a frequency domain; and
    monitoring for one or more physical downlink control channel (PDCCH) candidates in the one or more repetitions of the CORESET based at least in part on the cyclic shift configuration, wherein the cyclic shift configuration identifies a frequency domain cyclic shift for the one or more REG bundles.

2. The method of claim 1, wherein the CORESET is encoded with a plurality of PDCCH coded bits, and
    wherein the cyclic shift configuration identifies a cyclic shift for the plurality of PDCCH coded bits.

3. The method of claim 1, wherein the cyclic shift configuration identifies the frequency domain cyclic shift in terms of a quantity of REG bundles.

4. The method of claim 1, wherein a first cyclic shift configuration for a first repetition of the CORESET identifies a first cyclic shift index, and a second cyclic shift configuration for a second repetition of the CORESET identifies a second cyclic shift index.

5. The method of claim 1, further comprising:
    receiving the cyclic shift configuration for the one or more repetitions of the CORESET via radio resource control signaling.

6. The method of claim 1, wherein the cyclic shift configuration of a repetition of the one or more repetitions of the CORESET is based at least in part on a starting symbol index of the repetition.

7. The method of claim 1, wherein the cyclic shift configuration is based at least in part on a total quantity of repetitions of the CORESET.

8. The method of claim 1, wherein one or more demodulation reference signals of the one or more repetitions of the CORESET are configured to be time domain bundled.

9. The method of claim 1, wherein the CORESET is encoded with a plurality of PDCCH coded bits, and wherein determining the cyclic shift configuration for the one or more repetitions of the CORESET comprises:
    determining a sub-block interleaving configuration for the plurality of PDCCH coded bits of the one or more repetitions of the CORESET.

10. The method of claim 9, wherein the sub-block interleaving configuration for a repetition of the one or more repetitions of the CORESET is based at least in part on at least one of:
a starting symbol index of the repetition,
a total quantity of repetitions of the CORESET, or
a slot index of the repetition.

11. The method of claim 1, wherein the CORESET is encoded with a plurality of PDCCH coded bits, and wherein determining the cyclic shift configuration for the one or more repetitions of the CORESET comprises:
determining a bit interleaving configuration for the plurality of PDCCH coded bits of the one or more repetitions.

12. The method of claim 11, wherein the bit interleaving configuration for a repetition of the one or more repetitions of the CORESET is based at least in part on at least one of:
a starting symbol index of the repetition,
a total quantity of repetitions of the CORESET, or
a slot index of the repetition.

13. A network entity for wireless communication, comprising:
one or more memories; and
one or more processors coupled to the one or more memories, the one or more processors individually or collectively configured to:
determine a cyclic shift configuration for one or more repetitions of a control resource set (CORESET), the CORESET including one or more resource element group (REG) bundles and control channel element (CCE) to REG mapping that corresponds to consecutive REG bundles in a frequency domain; and
transmit one or more physical downlink control channel (PDCCH) candidates in the one or more repetitions of the CORESET based at least in part on the cyclic shift configuration, wherein the cyclic shift configuration identifies a frequency domain cyclic shift for the one or more REG bundles.

14. A method of wireless communication performed by a network entity, comprising:
determining a cyclic shift configuration for one or more repetitions of a control resource set (CORESET), the CORESET including one or more resource element group (REG) bundles and control channel element (CCE) to REG mapping that corresponds to consecutive REG bundles in a frequency domain; and
transmitting one or more physical downlink control channel (PDCCH) candidates in the one or more repetitions of the CORESET based at least in part on the cyclic shift configuration, wherein the cyclic shift configuration identifies a frequency domain cyclic shift for the one or more REG bundles.

15. The method of claim 14, wherein the CORESET is encoded with a plurality of PDCCH coded bits, and wherein the cyclic shift configuration identifies a cyclic shift for the plurality of PDCCH coded bits.

16. The method of claim 14, wherein the cyclic shift configuration identifies the frequency domain cyclic shift in terms of a quantity of REG bundles.

17. The method of claim 14, wherein a first cyclic shift configuration for a first repetition of the CORESET identifies a first cyclic shift index, and a second cyclic shift configuration for a second repetition of the CORESET identifies a second cyclic shift index.

18. The method of claim 14, further comprising:
transmitting the cyclic shift configuration for the one or more repetitions of the CORESET via radio resource control signaling.

19. The method of claim 14, wherein the cyclic shift configuration of a repetition of the one or more repetitions of the CORESET is based at least in part on a starting symbol index of the repetition.

20. The method of claim 14, wherein the cyclic shift configuration is based at least in part on a total quantity of repetitions of the CORESET.

21. The method of claim 14, wherein one or more demodulation reference signals of the one or more repetitions of the CORESET are configured to be time domain bundled.

22. The method of claim 14, wherein the CORESET is encoded with a plurality of PDCCH coded bits, and wherein determining the cyclic shift configuration for the one or more repetitions of the CORESET comprises:
determining a sub-block interleaving configuration for the plurality of PDCCH coded bits of the one or more repetitions.

23. The method of claim 22, wherein the sub-block interleaving configuration for a repetition of the one or more repetitions of the CORESET is based at least in part on at least one of:
a starting symbol index of the repetition,
a total quantity of repetitions of the CORESET, or
a slot index of the repetition.

24. The method of claim 14, wherein the CORESET is encoded with a plurality of PDCCH coded bits, and wherein determining the cyclic shift configuration for the one or more repetitions of the CORESET comprises:
determining a bit interleaving configuration for the plurality of PDCCH coded bits of the one or more repetitions.

25. The method of claim 24, wherein the bit interleaving configuration for a repetition of the one or more repetitions of the CORESET is based at least in part on at least one of:
a starting symbol index of the repetition,
a total quantity of repetitions of the CORESET, or
a slot index of the repetition.

26. A user equipment (UE) for wireless communication, comprising:
one or more memories; and
one or more processors coupled to the one or more memories, the one or more processors individually or collectively configured to:
determine a cyclic shift configuration for one or more repetitions of a control resource set (CORESET), the CORESET including one or more resource element group (REG) bundles and control channel element (CCE) to REG mapping that corresponds to consecutive REG bundles in a frequency domain; and
monitor for one or more physical downlink control channel (PDCCH) candidates in the one or more repetitions of the CORESET based at least in part on determining the cyclic shift configuration, wherein the cyclic shift configuration identifies a frequency domain cyclic shift for the one or more REG bundles.

27. The UE of claim 26, wherein the cyclic shift configuration is received via radio resource control signaling from a network entity.

28. The UE of claim 26, wherein the cyclic shift configuration is determined based at least in part on a starting symbol index associated with each repetition.

* * * * *